April 20, 1948. G. M. BICKNELL Re. 22,994
ANTIDETONATING DEVICE
Filed Feb. 5, 1942
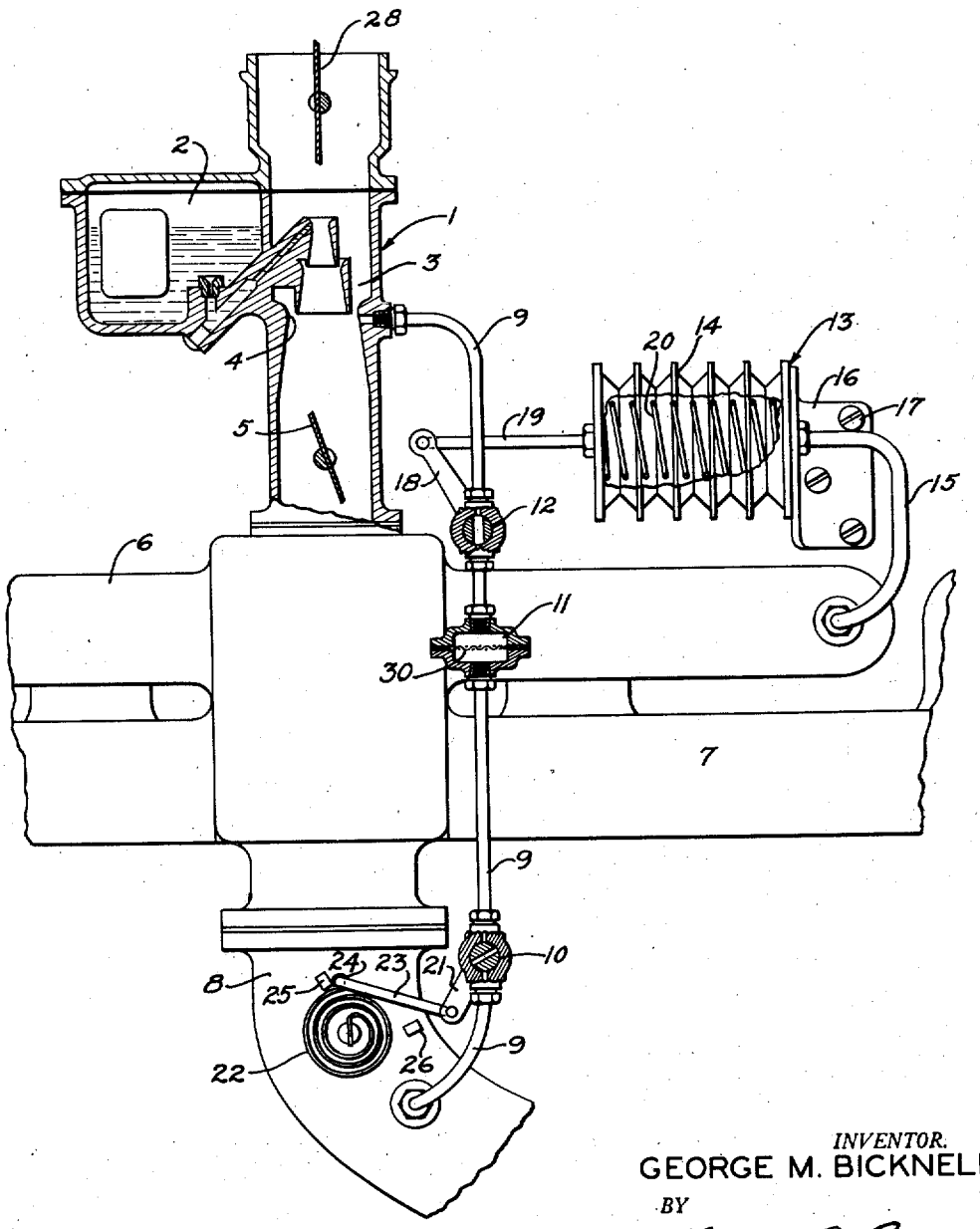
INVENTOR.
GEORGE M. BICKNELL
BY
George R. Ericson Reissued Apr. 20, 1948

Re. 22,994

UNITED STATES PATENT OFFICE 22,994

ANTIDETONATING DEVICE

George M. Bicknell, St. Louis, Mo., assignor to Carter Carburetor Corporation, St. Louis, Mo., a corporation of Delaware Original No. 2,317,582, dated April 27, 1943, Serial No. 429,605, February 5, 1942. Application for reissue April 24, 1944, Serial No. 532,527

13 Claims. (Cl. 123—119)

This invention relates to charge forming devices for internal combustion engines and more particularly to means for introducing engine exhaust gases into the fuel-air mixture.

In order to utilize, more satisfactorily, engine fuels of low octane rating in high compression engines, it is proposed herein to introduce into the mixture, formed with such fuel, variable quantities of engine exhaust gases under conditions of high volume operation. The dilution of the mixture with the inert constituents as well as the introduction of the $H_2O$ contained in the exhaust gases will reduce detonation.

It is, therefore, an object of the present invention to provide means for introducing exhaust gases into the fuel-air mixture under operating conditions in which the volume taken in by the engine cylinders is at or near maximum.

It is a further object of the present invention to provide means for introducing exhaust gases into the carburetor mixture conduit in a zone of comparatively high velocity and suction.

It is a further object of the present invention to control the introduction of exhaust gases into the mixture in accordance with the temperature.

It is another object to provide means to introduce cooled exhaust gases into the engine intake only at times when such gases may be effective to reduce the tendency to detonation.

Other objects and advantages will become apparent upon perusal of the following description and accompanying drawings in which:

The figure is a schematic arrangement embodying a form of the present invention and in which are shown portions of an engine intake and exhaust manifold, a carburetor, and the device for introducing exhaust gases into the mixture.

Numeral 1 generally indicates a downdraft carburetor having a constant level fuel chamber 2 for receiving fuel, a nozzle 27 communicating therewith and discharging into the carburetor mixture conduit 3, a choke valve 28 and a mixture control or throttling valve 5. The carburetor 1 may be of any suitable type arranged to produce a combustible mixture of fuel and air and having at least one constriction as indicated at 4. The carburetor is mounted on the intake manifold 6 in any suitable manner as by screws (not shown). Lying below and parallel to the intake manifold is the exhaust manifold 7 having an outlet indicated at 8.

A conduit 9 for conducting exhaust gases from the exhaust manifold to the carburetor mixture conduit at a point near the throat of the constriction 4 is provided and has interposed therein a control valve 10, a strainer and flame baffle 30 mounted in a chamber 11, and a control valve 12. For actuation of the control valve 12 the pressure responsive device 13 is provided which comprises a collapsible bellows 14 having a suction connection 15 to the intake manifold.

Enlarged chamber 11 and screen 30 provide for expansion and substantial cooling of the exhaust gases and condensation of moisture therein prior to admission into carburetor. Thus the antidetonating quality of the gases is enhanced.

The bellows 14 is rigidly mounted at one end on a bracket 16 which may be attached to any adjacent stationary part of the engine by screws 17. The valve 12 is provided with an operating lever 18 which is connected to the free end of bellows 14 by the connecting rod 19. A spring 20 disposed within the bellows 14 normally urges the free end of the bellows toward the left in an extended position and, consequently, control valve 12 in an open position as indicated.

The control valve 10 is also provided with an operating lever 21 which is connected to a temperature responsive bi-metallic coil 22 by means of the link 23. The coil 22 is rigidly mounted at its center and so wound (with the metal having the greatest coefficient of expansion on the outside) so as to uncoil with decreasing temperature. It will be seen, therefore, that with increasing temperatures the free end 24 of the coil will move clockwise thus moving control valve 10 from the closed position, as shown, to an open position. Stops 25 and 26 are provided to limit the travel of the free end of the coil 22. The coil 22 is so constructed and disposed as to respond to engine temperatures incidental to normal operation to move the valve 10 to an open position.

In operation, after the engine has been warmed up to normal operating temperature, the valve 10 will be in an open position. Valve 12 will be positioned in accordance with the pressure existing in the intake manifold. The position of the throttle valve 5 and the load on the engine will, obviously, be the factors determining the pressure in the intake manifold. It is the intention to calibrate the suction opposing spring 20 so as to correspond to those volumes of flow which would, without the introduction of exhaust gases, cause objectionable detonation. It will be understood that this calibration will, of course, vary for different engines and different octane fuels.

At higher intake manifold suctions, corresponding to throttled or high velocity non-throttled operation wherein the volume of the intake charge is less than that which would cause detonation, the valve 12 will be closed and the engine will operate on the conventional fuel-air mixture.

One reason for controlling the flow of exhaust gases to the mixture conduit in accordance with the temperature is that during cold starting when it is desirable to create a high suction on the fuel nozzle 27 by closing the choke valve 28 to obtain the rich mixture required for starting, it is necessary to close the conduit 9 lest this high suction be unduly relieved. Another reason being that, during the warming-up period, combustion temperatures and pressures will be less than those attained after the engine has reached a normal operating temperature and, therefore, the tendency to detonate will be less, thus requiring the introduction of less or no exhaust gases. By providing a constriction at or posterior to the discharge point of the fuel nozzle and introducing the exhaust gases at this constricted point, a better mixture of the exhaust gases and the fuel-air mixture is attained. Also, the reduced static pressure attending the comparatively high velocities at this restricted point assists in increasing the flow of exhaust gases through conduit 9.

The foregoing description and accompanying drawings are intended to be illustrative and not limiting and the exclusive use of all modifications within the scope of the appended claims is contemplated.

I claim:

1. The method of controlling combustion pressure in the combustion chamber of an internal combustion engine operating on a combustible mixture of liquid fuel and air which comprises diluting the mixture with exhaust gases of the engine, and varying the degree of such dilution in accordance with both the temperature of the engine and the suction in the intake manifold.

2. In an internal combustion engine, a carburetor having a mixture conduit, intake and exhaust manifolds, a conduit connecting the manifolds whereby exhaust gases may be caused to enter said intake manifold by the suction conditions therein, a normally closed valve controlling said conduit, said valve being moved toward open position upon increase in engine temperature conditions additional means closing said conduit, and suction operated means for moving said last-named means to open said conduit, said suction operated means being responsive to manifold pressure conditions defined by periods of normal detonation in said engine.

3. In an internal combustion engine, a carburetor having a mixture conduit, intake and exhaust manifolds, a conduit connecting the manifolds whereby exhaust gases may be caused to enter said intake manifold by the suction conditions therein, means normally closing said conduit when the engine temperatures are low, and means opening said conduit when the manifold pressures are such as to normally cause engine detonation.

4. In an internal combustion engine, a carburetor having a mixture conduit, intake and exhaust manifolds, a conduit connecting the manifolds whereby exhaust gases may be caused to enter said intake manifold by the suction conditions therein, means closing said conduit when the engine temperatures are low, and means opening said conduit as the engine temperature approaches normal and the manifold pressures are such as to normally cause engine detonation.

5. In an internal combustion engine, a carburetor having a mixture conduit, intake and exhaust manifolds, a conduit connecting the manifolds whereby exhaust gases may be caused to enter said intake manifold by the suction conditions therein, means normally closing said conduit when the engine temperatures are low, independent means controlling said conduit, said last-named means being normally closed regardless of temperature, and being opened by manifold pressures tending to cause engine detonation.

6. In an internal combustion engine, a carburetor having a mixture conduit, intake and exhaust manifolds, a conduit connecting the manifolds whereby exhaust gases may be caused to enter said intake manifold by the suction conditions therein, means normally closing said conduit when the engine temperatures are low and gradually moved to open said conduit as the engine temperatures increases, and independent means normally closing said conduit, said last-named means being moved toward open position by manifold pressures regardless of engine temperature.

7. In an internal combustion engine, a carburetor having a mixture conduit, intake and exhaust manifolds, a conduit connecting the manifold by the suction conditions therein, means normally closing said conduit when the engine temperature is low and gradually opening said conduit as the engine temperature increases, and means independent of the temperature controlled normally closing said conduit, said last-named means being operable to open said conduit when the manifold pressures are within a predetermined range.

8. A method for reducing the detonation in an internal combustion engine which includes recycling a portion of the exhaust gases from the exhaust manifold to the mixture in the intake manifold only at predetermined periods of the engine operation as defined by normal operating temperatures and manifold pressures tending to cause detonation.

9. In an internal combustion engine, exhaust and intake conduits, a duct connecting said conduits for supplying exhaust gases to the engine, means to control said duct in accordance with pressures in said intake conduit and the temperature of the engine, and a cooling device interposed in said duct for condensing moisture in the exhaust gases prior to admission to the engine.

10. In an internal combustion engine, a carburetor having a mixture conduit including an intake manifold, an exhaust discharge means including an exhaust manifold, a conduit connecting the mixture conduit with the exhaust discharge means, means normally closing said conduit when the engine temperature is low and gradually opening said conduit as the engine temperature increases, means operable within a predetermined range of intake manifold pressure for controlling additional means regulating the flow through said conduit, and means for cooling the gases permitted to flow into said conduit by the temperature controlled means and for discharging the cooled gases for control by the said pressure operating means.

11. In an internal combustion engine, exhaust and intake conduits, a duct connecting said conduits for supplying exhaust gases to the engine, means responsive to the temperature of the engine for reducing the supply of exhaust gases when the engine temperature is low, and a cooling device interposed in said duct.

12. In an apparatus for preventing detonation in an automotive vehicle internal combustion engine having an intake system, including a carburetor, and an exhaust system, the combination of means adapted to conduct a portion of the exhaust gases to the carburetor, a valve normally closing said conducting means, means automatically controlled by the engine for opening said valve only when the vacuum is low and detonation is likely to occur and thus permit a portion of the exhaust gases to be mixed with the explosive mixture of the engine and thereby prevent detonation, and a valve for regulating the quantity of exhaust gas passing to the carburetor when said first mentioned valve is open.

13. In an apparatus for preventing detonation in an automotive vehicle internal combustion engine having an intake manifold, a carburetor, a filter and an exhaust system, the combination of means adapted to conduct a portion of the exhaust gases from the exhaust system to the filter, a valve normally closing said conducting means, a diaphragm automatically controlled by the vacuum in the intake manifold to open the valve when the vacuum decreases to where detonation is likely to occur and thus permit a quantity of the exhaust gases to be mixed with the explosive mixture of the engine and thereby prevent detonation, the diaphragm closing the valve when the vacuum rises above the point where detonation is likely to occur, and additional means for regulating the quantity of exhaust gas passing to the filter when the aforesaid valve is open.

GEORGE M. BICKNELL.

REFERENCES CITED

The following references are of record in the file of this patent:

UNITED STATES PATENTS

| Number | Name | Date |
|---|---|---|
| 1,149,322 | Baker | Aug. 10, 1915 |
| 1,304,550 | Edison, Jr. | May 27, 1919 |
| 1,344,793 | Dasey | June 29, 1920 |
| 1,502,772 | Grinham | July 29, 1924 |
| 1,506,166 | Durrant | Aug. 26, 1924 |
| 1,511,274 | Druckey | Oct. 14, 1924 |
| 1,756,897 | Bilsky | Apr. 29, 1930 |
| 1,916,325 | McAdams | July 4, 1933 |
| 2,010,315 | Moore | Aug. 6, 1935 |
| 2,154,417 | Anderson | Apr. 18, 1939 |